May 20, 1952      G. A. TAYLOR      2,597,203

FLUID TEMPERATURE CONTROL

Filed Oct. 29, 1947      2 SHEETS—SHEET 1

INVENTOR
George A. Taylor
BY
ATTORNEY

May 20, 1952   G. A. TAYLOR   2,597,203
FLUID TEMPERATURE CONTROL
Filed Oct. 29, 1947   2 SHEETS—SHEET 2

INVENTOR
George A. Taylor
BY
*J. P. Moran*
ATTORNEY

Patented May 20, 1952

2,597,203

UNITED STATES PATENT OFFICE 2,597,203

FLUID TEMPERATURE CONTROL

George A. Taylor, East Orange, N. J., assignor to The Babcock & Wilcox Company, Rockleigh, N. J., a corporation of New Jersey Application October 29, 1947, Serial No. 782,776

8 Claims. (Cl. 122—480)

The present invention relates to fluid temperature control and more particularly to the construction and operation of fluid heat exchange apparatus wherein the temperature of fluid interiorly of tubes is controlled by regulating the flow of heating gases exteriorly of the tubes.

Heretofore, in heat exchange apparatus utilizing a gaseous medium exteriorly of tubes for imparting heat to a gaseous fluid or vapor interiorly of the tubes, numerous flue and damper arrangements have been devised with a view to maintaining more nearly uniform vapor outlet temperatures at varying loads or capacities. However, such forms of apparatus in many instances have involved expensive and complicated constructions and furthermore do not lend themselves to application in the simpler forms of superheater boiler constructions, nor in existing superheater boiler installations.

An object of my invention, therefore, is to provide a relatively simple and inexpensive form of fluid temperature control apparatus applicable, for example, to a vapor generating unit having its vapor superheating component formed of tubes in the path of heating gases from an associated furnace.

As an additional object it is my purpose to control the temperature of superheated vapor by proportioning the flow of heating gases over different portions of the heat transfer surface within a common heating gas pass.

Another object, in the operation of a gas heated boiler-superheater unit, is to control superheated vapor temperature by imposing a variable restriction in a portion of the path provided for heating gas flow under varying load conditions.

A further object, in the control of superheated vapor temperature under varying load conditions, is to variably restrict heating gas flow over a portion of the vapor heating surface while maintaining substantially unrestricted heating gas flow over another portion.

A further related object is to control superheated vapor temperature under increasing load conditions, by increasingly restricting heating gas flow over a predetermined portion of the vapor heating surface.

A more specific object in the control of vapor superheat temperature is to regulate heating gas flow by means supported mainly on freely suspended vapor conducting elements.

The various features of novelty which characterize my invention are pointed out with particularity in the claims annexed to and forming a part of this specification. For a better understanding of the invention, its operating advantages and specific objects attained by its use, reference should be had to the accompanying drawings and descriptive matter in which I have illustrated and described a preferred embodiment of my invention.

Of the drawings:

Fig. 3 is a fragmentary enlargement of Fig. 1 showing details of the construction, including a representation of damper elements in open and closed positions;

Fig. 4 is an enlarged fragmentary elevation, partly in section, illustrating a portion of the damper-supporting structure as viewed at line 4—4 of Fig. 3; and Figs. 5 and 6 are transverse sections of the structure shown in Fig. 4, taken along lines 5—5 and 6—6 respectively.

Figure 1:
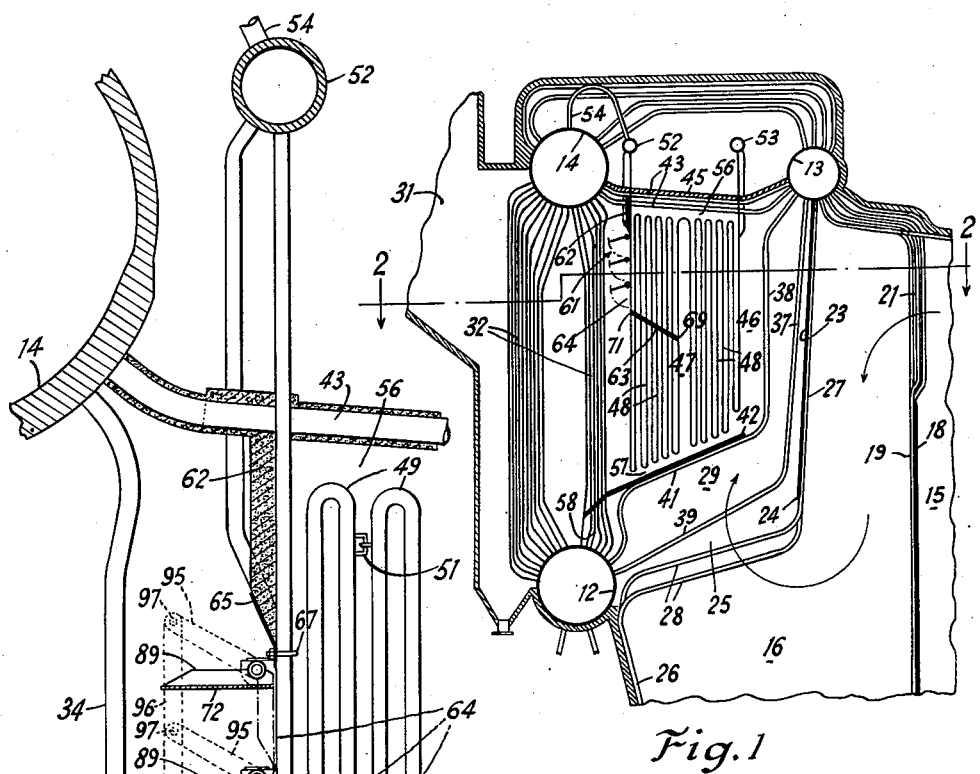
Fig. 1 is a partly diagrammatic, fragmentary, sectional side elevation of fluid heating apparatus including an embodiment of my invention.
Figure 2:
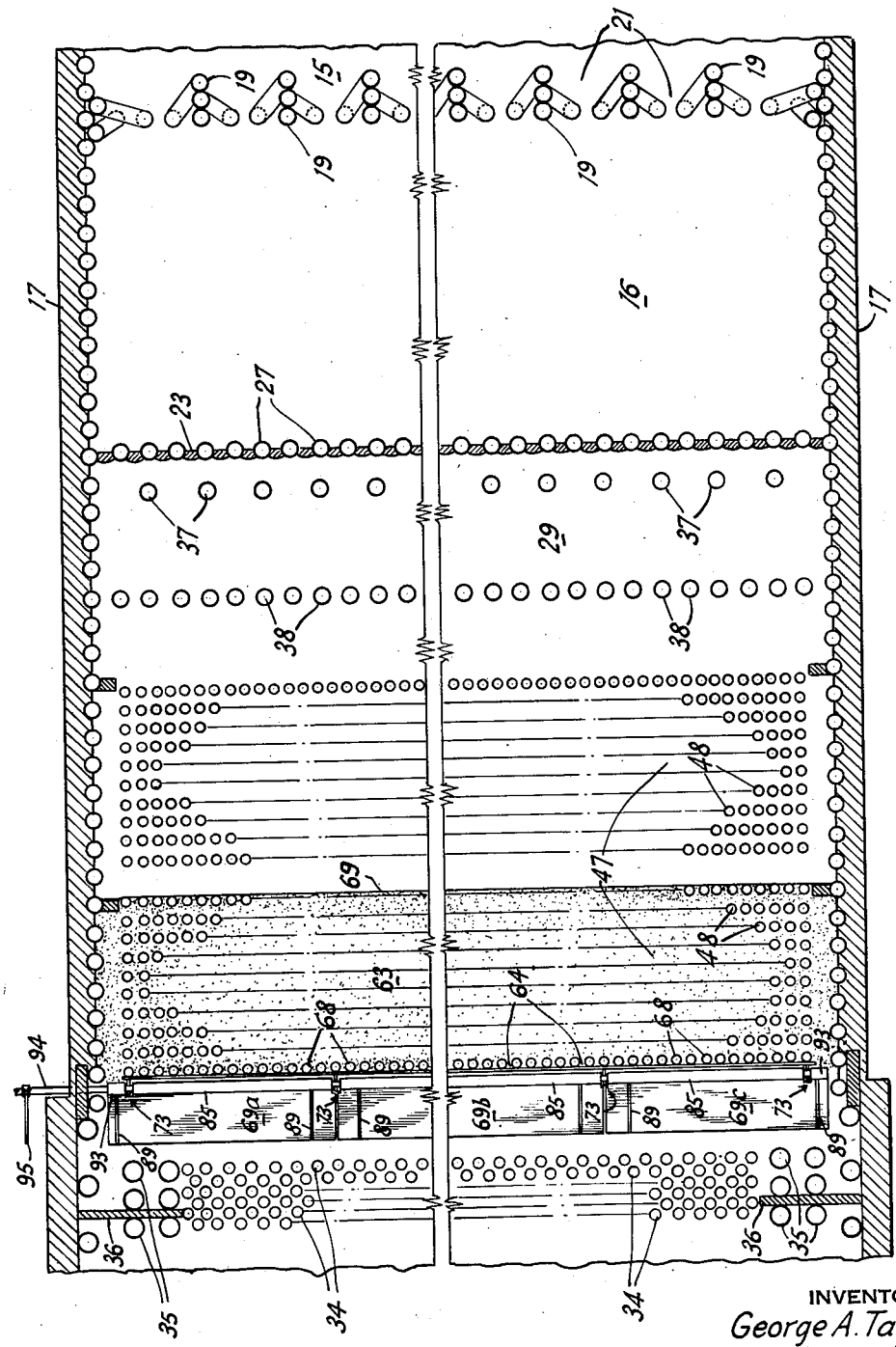
Fig. 2 is a sectional plan of the apparatus shown in Fig. 1, taken along line 2—2.

The illustrative embodiment of my invention is associated with a form of fluid heating apparatus commonly referred to as a vapor generating unit and normally comprising both vapor generating and vapor superheating components or sections. The unit as shown includes a bent tube vapor generating or boiler section, having a lower drum 12, and upper drums 13 and 14, interconnected by tubes disposed in the path of heating gases discharging from an associated fuel-fired furnace. As indicated in Figs. 1 and 2, the furnace includes a primary chamber 15 into which it may be assumed the fuel is initially delivered, and an adjoining secondary chamber 16 adapted to receive hot gases of combustion from the first named chamber. The furnace chambers 15 and 16 are continuous across the width of the setting between opposite fluid-cooled side walls 17, but in the gas flow direction, parallel to those walls, are separated by an upright dividing wall 18 formed at least in part by a row of tubes 19 having their upper ends connected to boiler drum 13 and having selected upper end portions bent out from the row to provide a screened gas flow passage 21 connecting upper end portions of the chambers.

An upright baffle wall 23, extending downwardly from the upper front drum 13, terminates in a lower edge portion 24 at an elevation slightly above the lower drum 15 and in horizontally spaced relationship to the lower drum to define a gas flow passage 25 therebetween. The wall 23 is formed mainly by a row of furnace wall tubes 26 having their upper ends connected to upper drum 13 and having upper end portions 27 fitted with suitable intertube closure means to provide a substantially continuous baffle wall structure. Wall tubes 26 are formed with horizontally inclined intermediate portions 28 which are arranged in screen formation and which extend forwardly and upwardly across the gas flow passage 25. The tube wall 23 constitutes a partition wall separating the upper part of chamber 16, at one side, from a boiler tube space 29, at the opposite side. Gases entering the upper portion of chamber 16, through gas passage 21, are directed downwardly therein to an enlarged lower portion wherein the direction of gas flow is reversed and the gases in turning around the lower end of partition 21 are caused to flow in a generally upward direction through the screened opening 25 into the tube space 29 which contains the main convection heated surface of the boiler-superheater unit, and from which gases are discharged through an upper gas outlet 31 extending substantially throughout the width of the setting.

The boiler section, as shown, comprises a main tube bank 32 formed of horizontally spaced upright tubes 34 extending between and connected at opposite ends to the lower and upper drums 12 and 14, respectively. In the illustrated arrangement, where a relatively small number of other tubes 35, of larger diameter than tubes 34, and more widely spaced, are grouped at opposite ends of tube bank 32, upright baffles 36 may be installed, inwardly from the respective side walls 17, to block off the lower resistance gas flow path provided between the more widely spaced tubes 35 of each group and thereby confine the major heating gas flow to the main bank of relatively closely spaced tubes 34.

Tubes 37 and 38, horizontally spaced in separate rows and connected at their opposite ends to boiler drums 12 and 13, are formed with vertically spaced lower end portions 39 and 41, respectively, disposed above the screen tube formation 28 and extending forwardly at an upward inclination toward baffle wall 23. A baffle 42, supported on the tube row portion 41, extends from a lower position adjacent to drum 12 to an upper position adjacent to and spaced from baffle wall 23 so as to direct the major portion of heating gases from chamber 16 toward the front portion of tube space 29. Upper portions of tubes 37 and 38 are arranged upright, as shown, with the tube rows horizontally spaced from each other and from the upright baffle wall 23. The front and rear upper drums 13 and 14 are connected by horizontally spaced circulating tubes 43 arranged, for example, in a plurality of rows and supporting a gas tight roof structure 45.

In the structure thus described, a space 46 is provided forwardly of the tube bank 32 for the accommodation of additional heat absorbing surface such as is afforded by a superheater 47, for example, of the multiple loop type, as indicated, and having tubes 48 arranged upright in successive tube coils or panels which are horizontally spaced throughout the width of the superheater space 46 between opposite side walls 17. As viewed in Fig. 1, the superheater tube coil assembly is suitably of greater extent vertically than horizontally, and of progressively increasing height toward its gas outlet end adjacent tube bank 32. In each coil or panel, successive tubes or tube lengths 48 are horizontally spaced and, being alternately connected by return bends 49 at opposite ends to form serially connected loops, provide a continuous fluid flow path from one end of the coil to the other. It is to be understood that adjacent tube loops and adjacent tube coils may be tied together in known manner at intervals throughout the height of the tube bank to maintain adjacent tube lengths 48 in predetermined spaced relation, while permitting adequate tube length movement to accommodate relative expansion and contraction. A single slip-joint connector 51 is indicated in Fig. 3 as an example of the type suitable for tying together adjacent tube loops. Successive coils at their inlet and outlet ends are extended between circulating tubes 43 and through roof 45, and are connected to suitably supported inlet and outlet superheater headers 52 and 53 from which the entire superheater assembly is freely suspended. Inlet header 52 is connected to drum 14 by vapor inlet tubes 54.

The superheater coils are proportioned in height so as to conform in general to the upper and lower boundaries of space 46 and thus, in the particular arrangement shown, provide a relatively small clearance space 56 between the upper loop ends of the coils and the circulating tubes 43, and a similarly small clearance space 57 between the lower loop ends of the coils and the tube-supported baffle 42. The superheater coils, being disposed above baffle 42 and above the baffle-supporting tube row portion 41, are thus also vertically spaced from the lower drum 12.

In the operation of a unit such as disclosed, the hot gases entering space 29 from furnace chamber 16 are directed forwardly by baffle 42 so as to pass into the upper part of the space along the rearward side of the upright front wall 23 where resistance to gas flow is relatively low due to the relatively wide spacing of tube portions 37 and 38 in this region. The hot gases, due to their inertia, thus tend to rise to the uppermost part of space 29 with the result that the gases are distributed substantially throughout the height of the space at its gas inlet end, thereby providing a continuous supply of hot gases substantially throughout the total gas inlet area of the adjacent superheater tube bank 47. The gases then follow a generally horizontal path through space 29, in contact with the superheater tubes of bank 47 and the boiler tubes of bank 32, and finally through gas outlet 31.

A known characteristic of a convection heated superheater of this general type is that, with the heating gases continuously in contact with a fixed amount of superheating surface, the temperature of the superheated outlet vapor increases with increasing loads and decreases with decreasing loads, due to the accompanying changes in gas volume and temperature. Thus, in order to maintain a sufficiently high vapor outlet temperature under minimum load conditions, an amount of superheating surface might be required which under maximum load conditions would result in vapor outlet temperatures becoming undesirably high. My invention therefore contemplates positive control of vapor outlet temperature, under a wide range of load conditions, suitably by regulating the effectiveness of a predetermined portion or area of the superheating surface. In general, as loads are increased, it is my purpose to impose a restriction on gas flow through a predetermined portion of the superheater space 46 and thereby reduce the proportion of heating gases flowing over a corresponding portion of the superheating surface, the restriction to gas flow, in the present embodiment, being limited to a predetermined upper portion of the space so as to permit unrestricted gas flow through the remaining lower portion. By making the restriction variable, the proportioning of gas flow over separate areas of superheating surface may be adjusted in accordance with load conditions to provide the degree of vapor outlet temperature desired, within limits determined by the particular design of unit.

A form of gas flow proportioning apparatus, suitable for the purpose described, is indicated in general in Fig. 1, and comprises a damper mechanism 61 mounted rearwardly of superheater 47 adjacent the upper portion thereof. The mechanism 61 is associated with suitably arranged wall means such as baffles 62 and 63 which provide definite delineation of a predetermined gas outlet area or opening 64 with respect to which the damper mechanism is designed to operate. It will be noted that the upright upper refractory baffle 62 extends downwardly from the roof structure 45 to a position below the upper ends of superheater tubes 48, thereby defining the upper margin of gas outlet area 64 and at the same time blocking off the rearward end of the upper clearance space 56. The baffle 62, which consists mainly of moldable ceramic refractory material hardened in place, may include a flanged metal plate portion 65 disposed along its lower edge and secured by U-bolts 67 to superheater tubes 68 in the rearmost row. The lower baffle or wall 63, suitably of a monolithic refractory type, extends across superheater tubes 48 in a plurality of rows in the rearmost section of the superheater tube bank 47, the baffle 63 being inclined upwardly in the downstream gas flow direction to define a gas pass converging toward the position of damper means 61. Baffle 63 extends from its lower edge 69 adjacent an intermediate row of the bank, and terminates in an upper edge 71 substantially flush with the downstream surfaces of tubes 68 to define the lower margin of the rectangular gas outlet area 64. The provision of baffle 63, inclined in the direction shown, renders the damper means 61 effective over a greater height of the superheater tube bank 47 than is represented by the height of the dampered gas discharge area 64. The extent of heat-absorbing surface over which damper control is effective is therefore greater than if the baffle 63 were omitted, or extended in a plane normal to the axes of the superheater tubes, or sloped downwardly toward the damper means position.

In further detail, and referring particularly to Figs. 2–6 inclusive, the damper element of the apparatus is of the multi-bladed type having blades 72 operable in unison, or separately, as desired. The damper assembly extends throughout the horizontal width of the gas outlet area 64, as indicated in Fig. 2, and damper blades 72, in closed position, provide a substantially complete closure throughout the vertical height of area 64, as indicated by the broken outline of blades 72 in Fig. 3. Each blade 72 is divided in length into a suitable number of spaced sections 72a, 72b, 72c, for example, to allow for the relative movement of adjacent portions resulting from expansion and contraction.

The damper assembly 61 is supported solely on superheater tubes 68 forming the rearmost row, the damper blades 72 being supported at vertically spaced locations; and each blade 72 being separately supported by means of supports 73 which are arranged to permit angular movement of the blade about a pivotal axis extending transversely of tubes 68 adjacent the rearward side of the row. Each damper blade 72 is supported at intervals along its length, between damper blade sections, for example, as detailed in Fig. 4, and also adjacent its ends as indicated in Fig. 2.

Each support 73 comprises a bearing lug or bracket 74 having its inner edge connected to a tube 68 by means of weld 75. A rectangular notch 76, formed in the inner edge of each lug 74 and having its upper end open, is adapted to receive a bar 78, suitably formed in sectional lengths so as to maintain the tubes 68 in substantially planar alignment throughout the width of the row. The bar 78, which may be continuous in length, or in sections, is connected to each lug 74 by a weld 79. A notch 81 is formed in the upper edge of each lug 74 to receive and support a hollow trunnion member 82, the base of notch 81 being arcuate in form to provide a suitable bearing surface. The trunnion 82 is retained in notch 81 by means of a narrow strap 83 spanning the notch and secured to the lug by a weld 84 at each end.

Each damper blade 72, or in the specific form shown, each damper blade section, is secured to a pipe or sleeve member 85 adapted to telescope with trunnion members 82 at opposite ends. The telescoped ends of parts 82 and 85 are separably connected by bolts 86 extending through diametrically positioned pairs of holes 87. Each damper blade section includes at least one stiffener bar 89, mounted edgewise thereon and extending transversely of the axis of rotation, each bar 89 being secured to a blade or blade section by welded connections 91 along its inner contacting edge, and to the pipe or sleeve member by a welded connection 92 at its inner end. It will be noted from Fig. 2 that in order to control gas flow throughout the width of gas outlet area 64, the damper blade assembly necessarily extends beyond the ends of the rearmost tube row 68. In this construction each support 73 adjacent one end is positioned intermediate the length of an end section 69a or 69c instead of between sections, and requires a short length sleeve member 93 and a corresponding stiffener bar 89 to adequately support each outboard damper blade portion.

Each damper blade assembly, at one end, includes an extension shaft 94 suitably connected to a sleeve length 93 at its inner end and terminating exteriorly of the adjacent setting wall 17 in an outer end portion to which an operating crank arm 95 is rigidly secured. As thus arranged, any one damper blade 72 may be operated separately, and thus may be maintained open or closed irrespective of the position of any other blade or group of blades. If it is desired to operate all damper blades 72 in unison, the crank arms 95 may be interconnected by means of a link bar 96 having a pivotal connection 97 with each crank arm 95. Operation of the group of blades may be effected by means of a lever 98 affixed to shaft 94 and having a chain 99, for example, connected thereto at opposite ends.

A desirable feature of the disclosed arrangement of temperature control apparatus is the flexibility with which superheat temperatures may be positively controlled particularly at the higher capacities. For example, in a vapor generating unit having superheater surface arranged as shown, and having a rated capacity of 350,000 lbs. of steam per hour, the superheated steam outlet temperatures, with damper 61 continuously open, could be expected to vary from about 850° F. at 70% rated capacity to about 890° F. at 100% rated capacity, an increase of 40° F. for a 30% increase in capacity. Under these conditions, gas flow is unrestricted throughout the entire superheater so as to render the total area of superheating surface effective, the vapor outlet temperature increasing with load due to the rising superheater characteristic. However, for the same capacity variation, with damper 61 continuously closed, the superheated steam outlet temperatures would range from about 820° F. at the 70% rating to about 870° F. at the 100% rating, an increase of 50° F. for the same increase in capacity. Under these last named conditions, the maximum restriction is imposed on gas flow through an upper portion of the superheater, while gas flow is unrestricted throughout all remaining portions. The result is a maximum reduction in the effectiveness of the upper superheater portion, and a consequent decrease in superheat temperatures throughout the range, as compared with the first named conditions. It will be understood therefore, that by operating with the damper fully open at the specified lower capacity and fully closed at the specified higher capacity, the overall steam temperature variation is reduced to 20° F., with actual steam temperatures ranging from about 850° F. to 870° F. At intermediate capacities, the damper 61 would normally be adjusted to positions intermediate the fully-closed and fully-open positions, to provide varying degrees of gas flow restriction through the upper portion of the superheater, thereby varying the effectiveness of the upper superheater portion so as to maintain the gradation of superheat temperatures desired.

It is to be noted that under maximum load conditions, when the heating gases are at their highest temperatures, the gas flow controlling dampers 72 are in a closed or substantially closed position and lie in a plane parallel to the plane of the adjacent fluid cooled tubes 68 on which they are directly mounted. Due to the proximity of the tubes which are at substantially lower temperature, the damper elements are cooled by radiant heat transfer to the tubes, and accordingly are made of relatively light weight heat resistant metal so that they may be mounted on the tubes, for adequate support thereby, and when mounted, may lie closely adjacent the tubes, for adequate heat transfer. Each blade 72, being formed of relatively thin metal plate, is adapted to be brought into contact with the adjacent tubes 68 substantially throughout its width when moved into closed position. Under lower load conditions, when gas flow and gas temperatures are lower, and dampers 72 are opened so as to increase the effectiveness of a greater extent of superheater surface, the heating gases which are thus permitted to flow over the controlled additional superheater surface, and between the dampers, are at temperatures of low enough level to permit the dampers to be maintained without serious deterioration.

It is advantageous to position damper means 61 across the uppermost portion of the superheater space 46 so as to make it effective with respect to the hotter gases which normally enter this region. Under low load conditions, when the dampers 72 are in open position, the gases flowing horizontally through the space tend to stratify, with the hotter gases forming the upper strata and enabling a higher superheat temperature to be maintained at low loads. As the load is increased, and dampers 72 are moved toward the closed position, the restriction of gas flow is effective with respect to the hotter strata so as to provide a lower increase in superheat temperature at increasing loads.

It will be further noted that, in the practice of my invention, the control of superheat is effected solely by the regulation of suitably directed heating gas flow and thus obviates the need of special gas bypass conduits and dampers so often employed in prior art structures. For this reason, the invention may advantageously be incorporated in existing boiler installations since no change in internal volume of the unit is required, nor any change in the amount of superheating surface. With respect to the particular form of boiler unit herein illustrated, it is acknowledged that some of the heating gases, under high load conditions, might be caused to pass through space 58 between the lower end of baffle 42 and the lower drum 12, thereby bypassing the main body of superheating surface and contributing in part to a levelling-off of superheater outlet temperatures at high loads. It will be recognized however that my invention contemplates an improvement in superheat control apparatus which in operation is entirely independent of such incidental bypassing of heating gases and which therefore is equally applicable to boiler units in which no bypassing of gases occurs, since the ultimate superheat temperature is continuously under positive control of the specially arranged gas flow regulating means 61, particularly as arranged with respect to the gas flow directing means 63.

While in accordance with the provisions of the statutes I have illustrated and described herein the best form of my invention now known to me, those skilled in the art will understand that changes may be made in the form of the apparatus disclosed without departing from the spirit of the invention covered by my claims, and that certain features of my invention may sometimes be used to advantage without a corresponding use of other features.

I claim:

1. In a superheated steam generator, a steam and water drum, steam generating tubes connected to discharge to said drum, means defining a horizontally extending single pass heating gas passage containing the major portions of said tubes and continuing to a gas outlet beyond said tubes, a superheater receiving steam from said drum and comprising a bank of spaced upright tubes extending across said passage in advance of said steam generating tubes, means supplying heating gases to said passage at the end forwardly of said bank, adjustable damper means supported on a row of said superheater tubes remote from said gas inlet end of said passage for effecting a superheat regulating restriction of the flow of the heating gases over end portions of tubes of said bank, said damper means having separately pivoted damper blade portions arranged to lie in a plane parallel to the axes of said supporting tubes, in contact with said supporting tubes, when rotated to a position of maximum flow restriction, and means for operating said damper blade portions from a location exteriorly of said passage at a side paralleling the flow of heating gases therethrough.

2. In combination with a superheater having its heating surface freely suspended within a gas flow pass through which heating gases are directed substantially horizontally in a single pass throughout the vertical extent thereof, said heating surface being provided mainly by tubular heat absorbing elements having upright tube length portions spaced apart in rows extending transversely of said heating gas flow, and damper means supported solely on elements of one of said rows for controlling the flow of said single pass heating gases over said heating surface, said damper means comprising at least one damper blade having support means along one edge arranged for pivotal blade movement about a horizontal axis, said damper blade support means comprising brackets secured to tube lengths in said one row of elements, and relatively rigid means supported by said brackets and engaging tube lengths of said row for maintaining said engaged tube lengths substantially in alignment in the plane of said row.

3. In combination with a superheater having its heating surface freely suspended within a gas flow pass through which heating gases are directed substantially horizontally, said heating surface being provided mainly by tubular heat absorbing elements having upright tube length portions spaced apart in rows extending transversely of said heating gas flow, and damper means supported solely on elements of one of said rows for controlling the flow of heating gases over said heating surface, said damper means comprising damper blades having separate supports arranged for pivotal blade movement about vertically spaced horizontal axes, each of said damper blade supports comprising brackets having inner edge portions secured to tube lengths in the furthermost downstream row of said elements, horizontally axised trunnion members each received in and supported by one of said brackets, and tubular means integral with each of said damper blades and telescopingly received and supported by at least two of said trunnion members, said brackets having notches formed in their respective inner edge portions adjacent the tube lengths to which said brackets are secured and having a bar received in said notches for maintaining said tube lengths substantially in alignment in the plane of said row.

4. In combination with a superheater having its heating surface within a gas flow pass through which heating gases are directed substantially horizontally, said heating surface being provided mainly by tubular heat absorbing elements having upright tube length portions spaced apart in rows extending transversely of said heating gas flow, and damper means supported solely on elements of one of said rows for controlling the flow of heating gases over said heating surface, said damper means comprising damper blades at successive elevations having separate supports arranged for pivotal blade movement about vertically spaced horizontal axes, each of said damper blade supports comprising brackets secured to tube lengths in the furthermost downstream row of said elements, said damper blades in closed positions providing a space between blades at successive elevations, and means supported by brackets for one of said blades for closing said interblade space while restraining the respective bracket-supporting tube lengths against relative displacement.

5. In a vapor generator having vertically spaced drums comprising a lower drum and an upper drum, a bank of vapor generating tubes extending between and connecting said drums, means defining a heating gas passage containing said tube bank through which heating gases are caused to flow horizontally in a single pass throughout the total vertical cross sectional area of said passage to an upper gas outlet downstream of said tube bank, a superheater having the major portion of its heating surface formed of tubes disposed within said passage at an upstream position relative to the position of said tube bank, said superheater tubes being arranged in successive rows relative to the flow of said gases, damper means supported on superheater tubes of one of said rows for controlling the flow of said gases over a predetermined upper portion of said heating surface, and means defining the gas flow area of said passage over which said damper means is effective comprising a baffle arranged intermediate the height of said passage and sloping upwardly in a downstream direction across rows of said superheater tubes and terminating in an upper edge portion adjacent the lowermost portion of said damper means.

6. In a vapor generator having vertically spaced horizontally disposed drums including a lower drum and at least one upper drum, vapor generating tubes connecting said drums, means defining a single pass gas flow passage forwardly adjoining the vertical space between said drums and continuing throughout substantially the total height of said space to a gas outlet at the downstream side of said vapor generating tubes, means for directing gases substantially horizontally through said passage to said outlet, a superheater in the path of said gases having an upper portion of its vapor heating surface within an upper portion of said passage, means for conducting vapor to said superheater from said upper drum, and adjustable damper means controlling the flow of said gases through and from the upper portion of said passage and thereby over said upper portion of the vapor heating surface contained therein, said damper means extending downwardly from the upper boundary of said passage in overlapping relationship to said upper vapor heating surface portion at the downstream side thereof.

7. In a superheated steam generator, a steam and water drum, steam generating tubes connected to discharge into said drum, means including said drum defining a horizontally extending single pass heating gas passage containing the major portions of said tubes and continuing to a gas outlet beyond said tubes, a superheater receiving steam from said drum and comprising a bank of spaced upright tubes extending across said passage in advance of said steam generating tubes, means supplying heating gases to said passage at the end forwardly of said bank, said steam generating tubes being displaced rearwardly from said superheater tubes to provide a gas receiving space between said generating tubes and superheating tubes, and adjustable damper means in said gas receiving space directly adjacent to and extending over a substantial portion of the height of a row of said superheater tubes remote from said gas inlet end of said passage for effecting a superheat-regulating restriction of the flow of the heating gases over end portions of tubes of said bank.

8. In combination with a superheater having its heating surface freely suspended within a gas flow passage through which heating gases are directed substantially horizontally in a single pass throughout the vertical extent thereof, said heating surface being provided mainly by tubular heat absorbing elements having upright tube length portions spaced apart in rows extending transversely of said heating gas flow, damper means arranged directly adjacent to the furthermost downstream row of said superheater elements for controlling the flow of heating gases over said heating surface, and means defining a predetermined outlet area of said pass over which said damper means is effective comprising vertically spaced baffles arranged respectively above and below said damper means, said baffles including an upper upright baffle directly adjacent said furthermost downstream row and terminating downwardly in a lower edge portion marginally of said predetermined gas outlet area at said downstream row, said baffles including a lower horizontally inclined baffle arranged intermediate the height of said passage and extending across superheater tube length portions in a plurality of said rows and terminating at said furthermost downstream row in an upper edge portion marginally of said predetermined outlet area.

GEORGE A. TAYLOR.

REFERENCES CITED

The following references are of record in the file of this patent:

UNITED STATES PATENTS

| Number | Name | Date |
| --- | --- | --- |
| 1,723,905 | Yarrow | Aug. 6, 1929 |
| 2,023,223 | Gordon | Dec. 3, 1935 |
| 2,226,445 | Smith | Dec. 24, 1940 |
| 2,254,373 | Langvand | Sept. 2, 1941 |
| 2,367,193 | Blizard | Jan. 16, 1945 |
| 2,386,188 | Artsay | Oct. 9, 1945 |